United States Patent
Polepalli

(10) Patent No.: US 11,723,098 B2
(45) Date of Patent: Aug. 8, 2023

(54) MULTI-PATH CELLULAR CHANNEL EXTENSIONS TO SUPPORT MULTIPLE SIMULTANEOUS PACKET DATA NETWORKS

(71) Applicant: Fortinet, Inc., Sunnyvale, CA (US)

(72) Inventor: Shashidhar Polepalli, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 64 days.

(21) Appl. No.: 17/238,324

(22) Filed: Apr. 23, 2021

(65) Prior Publication Data
US 2022/0346169 A1    Oct. 27, 2022

(51) Int. Cl.
*H04W 76/16*    (2018.01)
*H04W 88/16*    (2009.01)

(52) U.S. Cl.
CPC ........... *H04W 76/16* (2018.02); *H04W 88/16* (2013.01)

(58) Field of Classification Search
None
See application file for complete search history.

(56) References Cited

U.S. PATENT DOCUMENTS

2005/0195762 A1* 9/2005 Longoni ............. H04L 65/1095
                                                         370/328
2014/0370843 A1* 12/2014 Cama ................... H04W 24/08
                                                         455/405

OTHER PUBLICATIONS

"Verizon Split Data Routing", available from https://opendevelopment.verizonwireless.com/content/dam/opendevelopment/pdf/Verizon_Split_Data_Routing_Dual_APN_Overview.pdf before Apr. 2021.

* cited by examiner

*Primary Examiner* — Hong Shao
(74) *Attorney, Agent, or Firm* — HDC Intellectual Property Law, LLP

(57) ABSTRACT

Embodiments discussed generally relate to cellular network gateways. In some cases, embodiments discussed relate to cellular network gateways capable of processing multiple streams of IP traffic over multiple channels.

20 Claims, 9 Drawing Sheets

MULTI-PATH CELLULAR CHANNEL EXTENSIONS TO SUPPORT MULTIPLE SIMULTANEOUS PACKET DATA NETWORKS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments discussed generally relate to cellular network gateways. In some cases, embodiments discussed relate to cellular network gateways capable of processing multiple streams of IP traffic over multiple channels.

BACKGROUND

Network communications are often transferred between physically wired network devices and wirelessly connected network devices. Such transfers may be done, for example, by transferring IP traffic from a channel connected to the physically wired network device to a channel connected to a cellular network device using a cellular modem. Such cellular modems allow for connecting one channel from the wired network device to the cellular network. Such one to one transfer processes are not capable of handling multiple to multiple channel transfers between cellular network devices and a physically wired network device such as, for example, a network firewall device.

Hence, there exists a need in the art for more advanced approaches, devices and systems for transferring IP traffic between physically wired network devices and cellular network devices.

SUMMARY

Various embodiments provide systems and methods for providing multiple to multiple IP traffic connections between private networks or the Internet and public data networks (PDN).

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
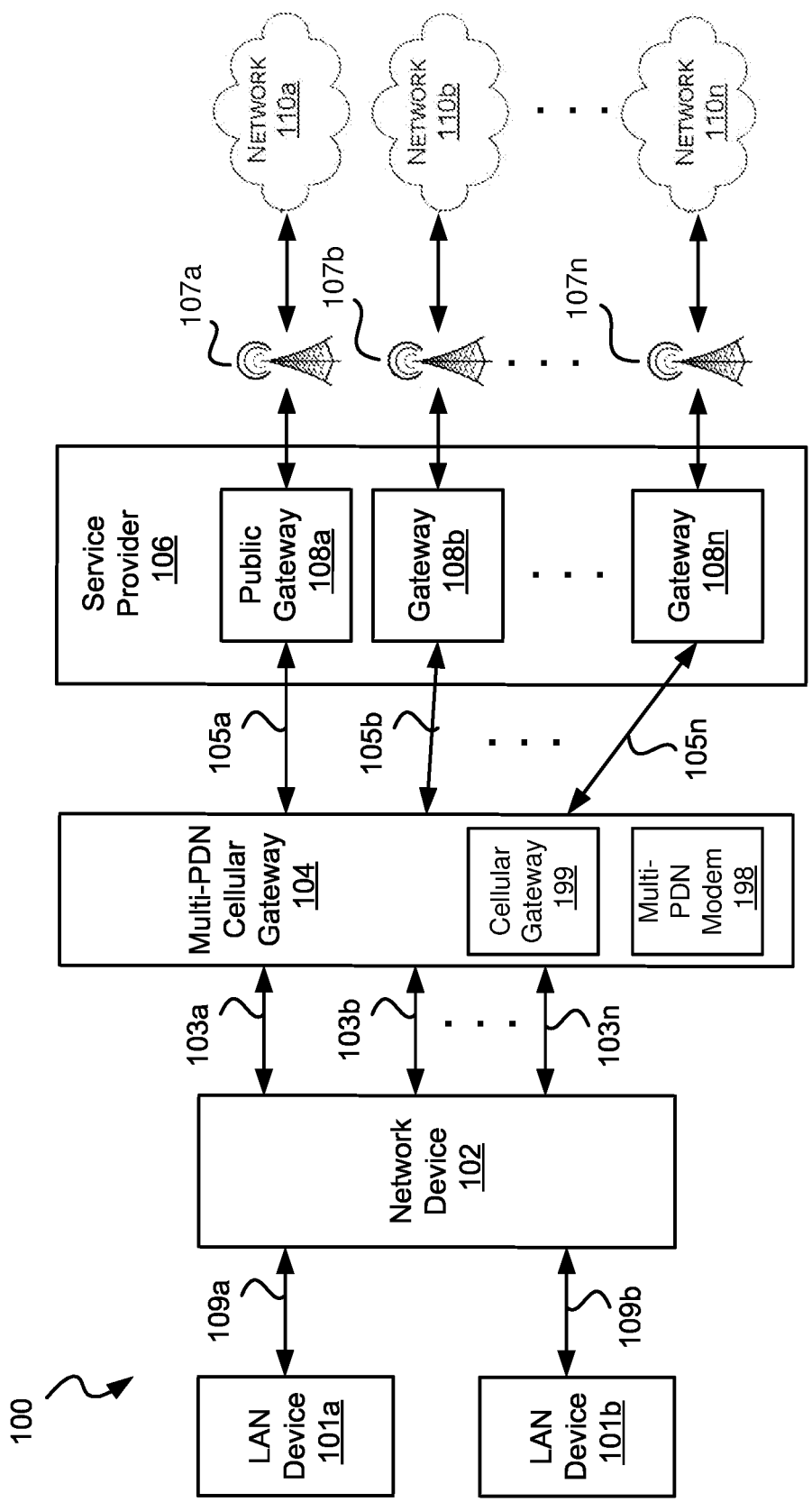
FIG. 1A shows a network environment including a multi-PDN cellular gateway capable of establishing multiple channels of IP traffic between a network device and a service provider in accordance with some embodiments.

Various embodiments provide systems and methods for providing multiple to multiple IP traffic connections between private networks or the Internet and PDNs.

Embodiments of the present disclosure include various processes, which will be described below. The processes may be performed by hardware components or may be embodied in machine-executable instructions, which may be used to cause a general-purpose or special-purpose processor programmed with the instructions to perform the processes. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Various embodiments provide methods that include: activating, by a processing device, at least a first modem and a second modem, where the first modem and the second modem are each capable of accessing a cellular network; establishing, by the processing device, a first data channel between the processing device and a network device, and a second data channel between the processing device and the network device; mapping, by the processing device, the first channel to the first modem and the second channel to the second modem; transferring, by the processing device, data received from the first modem to the network device via the first data channel and data received from the second modem to the network device via the second data channel; and transferring, by the processing device, data received from the first data channel to the cellular network via the first modem, and data received from the second data channel to the cellular network via the second modem.

In some instances of the aforementioned embodiments, the network device is a network access device. In some cases, the network access device is a network firewall. In various instances of the aforementioned embodiments, the processing device is incorporated in a cellular gateway. In some cases, the processing device, the first modem, and the second modem are incorporated in a multi-modem cellular gateway. In some such cases, the first modem includes a first subscriber identity module corresponding to a first data channel to the cellular network, and the second modem includes a second subscriber identity module corresponding to a first data channel to the cellular network.

Some embodiments provide methods that include: creating, by a network device, at least a first data channel between the network device and a cellular gateway device, and a second data channel between the network device and a cellular gateway device; configuring, by the network device, a first interface for transferring data over the first data channel and a second interface for transferring data over the second data channel; mapping, by the network device, a first type of data to the first interface and a second type of data to the second interface; requesting, by the network device, establishment of a first cellular communication channel for the first data channel, and a second cellular communication channel for the second data channel; identifying, by the network device, a first data set as including the first type of data, and transferring, by the network device, the first data set to the first cellular communication channel via the first interface, the first data channel, and the cellular gateway; and identifying, but the network device, a second data set as including the second type of data, and transferring, by the network device, the second data set to the second cellular communication channel via the second interface, the second data channel, and the cellular gateway.

In some instances of the aforementioned embodiments, the methods further include multiplexing, by the network device, a third data set received from the cellular network via the cellular gateway, the first data channel, and the first interface and a fourth data set received from the cellular network via the cellular gateway, the second data channel, and the second interface into a common transmission data set for distribution with a network serviced by the network device.

In various instances of the aforementioned embodiments, the network device is a network access device. In some cases, the network access device is a network firewall. In various instances of the aforementioned embodiments, the processing device is incorporated in a cellular gateway. In one or more instances of the aforementioned embodiments, the cellular gateway is a multi-modem cellular gateway including a cellular gateway device, a first modem having a first subscriber identity module corresponding to a first communication channel to the cellular network, and a second modem having a second subscriber identity module corresponding to a second communication channel to the cellular network. In some instances of the aforementioned embodiments, the first type of data is streaming data, and wherein the second type of data is non-streaming data.

Some embodiments provide network firewall devices that include: a processing device, and a computer readable medium. The computer readable medium includes non-transitory instructions which when executed by the processing device cause the processing device to: create at least a first data channel between the network device and a cellular gateway device, and a second data channel between the network device and a cellular gateway device; configure a first interface for transferring data over the first data channel and a second interface for transferring data over the second data channel; map a first type of data to the first interface and a second type of data to the second interface; request establishment of a first cellular communication channel for the first data channel, and a second cellular communication channel for the second data channel; identify a first data set as including the first type of data, and transferring, by the network device, the first data set to the first cellular communication channel via the first interface, the first data channel, and the cellular gateway; and identify a second data set as including the second type of data, and transferring, by the network device, the second data set to the second cellular communication channel via the second interface, the second data channel, and the cellular gateway.

In some instances of the aforementioned embodiments, the first type of data is streaming data, and wherein the second type of data is non-streaming data. In various instances of the aforementioned embodiments, the computer readable medium further includes non-transitory instructions which when executed by the processing device cause the processing device to multiplex a third data set received from the cellular network via the cellular gateway, the first data channel, and the first interface and a fourth data set received from the cellular network via the cellular gateway, the second data channel, and the second interface into a common transmission data set for distribution with a network serviced by the network device.

In some instances of the aforementioned embodiments, the cellular gateway is a multi-modem cellular gateway including a cellular gateway device, a first modem having a first subscriber identity module corresponding to a first communication channel to the cellular network, and a second modem having a second subscriber identity module corresponding to a second communication channel to the cellular network.

Other embodiments provide a non-transitory computer-readable storage medium embodying a set of instructions, which when executed by one or more processing resources of a computing device, causes the one or more processing resources to perform a method comprising: activating at least a first modem and a second modem, wherein the first modem and the second modem are each capable of accessing a cellular network; establishing a first data channel between the processing device and a network device, and a second data channel between the processing device and the network device; mapping the first channel to the first modem and the second channel to the second modem; transferring data received from the first modem to the network device via the first data channel and data received from the second modem to the network device via the second data channel; and transferring data received from the first data channel to the cellular network via the first modem, and data received from the second data channel to the cellular network via the second modem.

In some instances of the aforementioned embodiments, the network device is a network access device. In some cases, the network access device is a network firewall. In various instances of the aforementioned embodiments, the processing device is incorporated in a cellular gateway. In some cases, the processing device, the first modem, and the second modem are incorporated in a multi-modem cellular gateway. The first modem includes a first subscriber identity module corresponding to a first data channel to the cellular network, and the second modem includes a second subscriber identity module corresponding to a first data channel to the cellular network.

Example embodiments will now be described more fully hereinafter with reference to the accompanying drawings, in which exemplary embodiments are shown. This disclosure may, however, be embodied in many different forms and should not be construed as limited to the embodiments set forth herein. Thus, for example, it will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Turning to FIG. 1A, shows a network environment including a multi-PDN cellular gateway 104 capable of establishing multiple channels of IP traffic between a network device 102 and a service provider 106 is shown in accordance with some embodiments. Network device 102 may be any device or system by which a network is accessed. Thus, for example, network device 102 may be network gateway or router that supports a number of other network devices, services, or systems. As one particular example, network device 102 may be a firewall device that provides a number of threat detection and mitigation technologies to secure a network. In such cases, primary control of threat protection is performed by network device 102. It is also possible that some level of threat detection and/or mitigation is performed by multi-PDN cellular gateway 104. Based upon the disclosure provided herein, one of ordinary skill in the art will recognize a variety of other types of network devices and systems that may be used as network device 102.

Network device 102 may support a number network devices and/or systems. Thus, as an example, network device 102 may communicably couple a local area network device 101a to network device 102 via either a wired or wireless communication channel 109a, and to another local area network device 101b to network device 102 via either a wired or wireless communication channel 109b. In such a configuration, local area network device 101a may provide public access within the network supported by network device 102, and local area network device 101b may provide secured access within the network supported by network device 102. Based upon the disclosure provided herein, one of ordinary skill in the art will recognize a variety of network devices, services, and/or systems that may be accessed via network device 102 in accordance with different embodiments.

Multi-PDN cellular gateway 104 is capable of supporting multiple independent channels 103 (e.g., channel 103a, channel 103b, and channel 103n) each carrying a stream of IP traffic to/from service provider 106. Multi-PDN cellular gateway 104 includes a multi-PDN modem 198 and a cellular gateway 199. While multi-PDN modem 198 and cellular gateway 199 are shown integrated into a common device, in other embodiments multi-PDN cellular gateway 104 may be implemented as a single cellular gateway 199 that is separate from a single multi-PDN modem 198. In such a case, cellular gateway 199 is physically wired to multi-PDN modem 198. In other embodiments, cellular gateway 199 may be physically wired to two or more separate multi-PDN modems 199.

Cellular gateway 199 is configured to prepare data received from network device 102 for transmission onto a cellular network via multi-PDN modem 198, and to prepare data received from a cellular network via multi-PDN modem 198 for transmission to network device 102. In particular, cellular gateway 199 receives the multiple streams of IP traffic via channels 103 from network device 102. Cellular gateway 199 is managed by network device 102. Cellular gateway 199 receives the multiple streams of IP traffic from the cellular provider (service provider 106) via multi-PDN modem 198, identifies the various streams of traffic using, for example, source/subnet IPs, and sends the individual streams of traffic to network device 102 over respective ones of channels 103 associated with the particular type of traffic.

Multi-PDN modem 198 includes a number of PDN modems each capable of supporting a cellular communication link (i.e., a cellular "line") that is capable of transmitting and receiving data to/from service provider 106. Thus, data from network device 102 is received by multi-PDN modem 198 via cellular gateway 199, and multi-PND modem 198 wirelessly transmits the data to PDN 105 via channels 105. Similarly, data received from PDN via channels 105 is received by multi-PDN modem 198 and provided to cellular gateway 199.

Service provider 106 may be any communication system provider capable of supporting two or more cellular communication channels 105 (e.g., communication channel 105a, communication channel 105b, and communication channel 105n) allowing access to various networks 110 (e.g., network 110a, network 110b, and network 110n). In some cases, service provider 106 is capable of provisioning both public gateways (e.g., public gateway 108a) and non-public gateways (e.g., gateway 108b and gateway 108n). As indicated, the number of channels 105 and the number of gateways 108 is variable between one and "n".

Networks 110 may be any network accessible via a cellular network including, but not limited to, the Internet or a private network. Each network 110 is accessed using a gateway 108 that is provisioned to access the particular network. In operation, gateway 108 receives and transmits data to the particular network 110 via an antenna 107 (e.g., antenna 107a, antenna 107b, and antenna 107n). Based upon the disclosure provided herein, one of ordinary skill in the art will recognize a variety of networks that may be reachable via PDN service provider 106 in accordance with different embodiments.

Additional discussion of various operational processes supported by the system of FIG. 1A are discussed below in relation to FIGS. 2-7. Based upon the disclosure provided herein, one of ordinary skill in the art will recognize a variety of processes that may be supported by the system of FIG. 1A to transmit and receive data traffic via a cellular network that are possible in accordance with different embodiments.

Figure 1B:
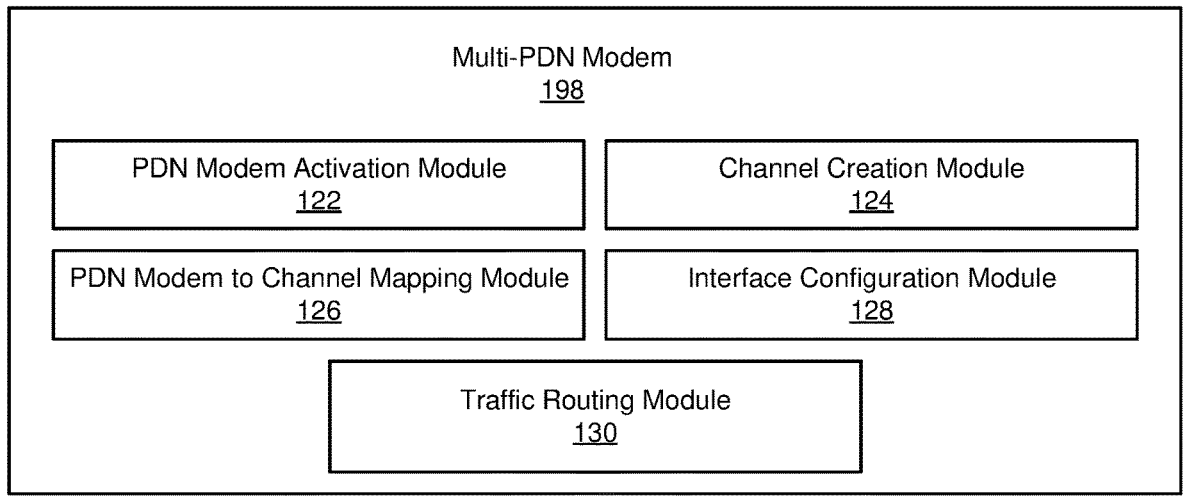
FIG. 1B is a modular diagram of a multi-PDN modem including functionality that may be used in relationship with various embodiments.

Turning to FIG. 1B, a modular diagram of multi-PDN modem 198 shows functionality that may be used in relationship with various embodiments. Multi-PDN modem 198 includes a PDN modem activation module 122 that is capable of receiving a request from cellular gateway 199 to activate a number of PDN modems, and to activate the requested number of PDN modems where the cellular gateway has approval to use the requested number of PDN modems.

Multi-PDN modem 198 includes a channel creation module 124 that creates a cellular communication channel for each of the activated PDN modems for communication between the respective PDN modem and cellular gateway 199. In particular, a number of cellular communication channels corresponding to the number of activated PDN modems are created. A PDN modem to channel mapping module 126 maps each of the activated PDN modems to one of the created cellular communication channels. Thus, the processes of channel creation module 124 and PDN modem to channel mapping module 126 combine to, for each activated PDN modem, establish a cellular communication channel between the respective PDN modem and the service provider. Any type of channel supported by both the respective PDN modem and the cellular gateway may be established including, but not limited to, virtual local area network (VLAN), tunnel, or virtual interface may be established.

An interface configuration module 128 configures an interface for each of the respective channels between the PDN modems and cellular gateway 199. The interface is the physical and/or virtual location on the multi-PDN modem 198 where data to be transmitted via a particular channel is presented, and where data received on the particular channel is received. Such interface establishment may be done using any approach for provisioning and/or designating an interface that may be known in the art. A traffic routing module 130 controls the direction of traffic received from a cellular network (i.e., a gateway 108 of service provider 106) to cellular gateway 199 via the assigned interface and mapped channel 105. Similarly, traffic routing module 130 controls the direction of data received from cellular gateway 199 via the assigned interface and mapped channel 105 to the cellular network (i.e., a gateway 108 of service provider 106).

Figure 1E:
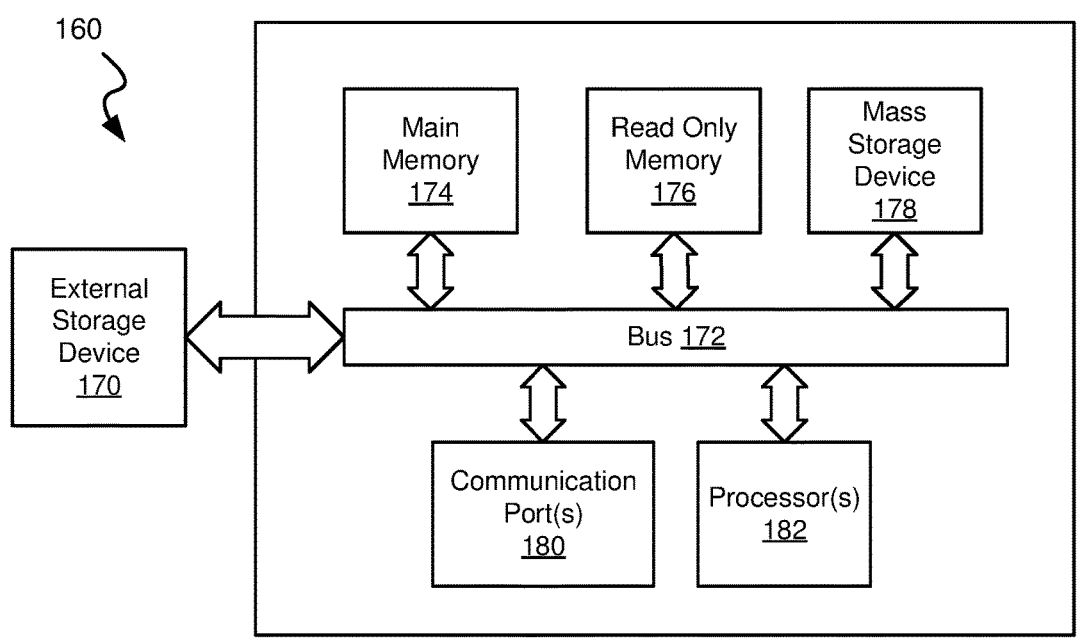
FIG. 1E shows an example computer system in which or with which embodiments may be utilized.
Figure 1C:
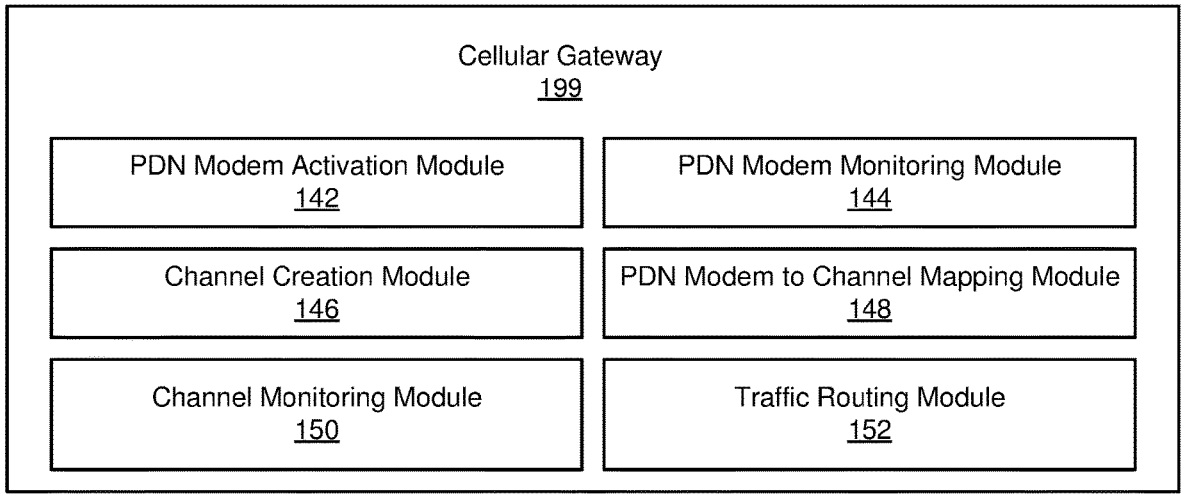
FIG. 1C is a modular diagram of a cellular gateway including functionality that may be used in relationship with various embodiments.

Turning to FIG. 1C, a modular diagram of cellular gateway 199 shows functionality that may be used in relationship with various embodiments. A PDN activation module 142 is configured to request activation of two or more PDN modems included as part of multi-PDN modem 198. In some cases, the number of PDN modems requested corresponds to a number of "lines" that have been authorized by the service provider 106 for cellular gateway 199. This authorization may be done, for example, by a user contacting service provider 106 to purchase support for a defined number of PDN modems. In return, service provider 106 provides a subscriber identity module (SIM) indicating the purchased PDN modems. This SIM is then installed in cellular gateway 199.

In response to the request for the number of PDN modems, multi-PDN modems 198 responds with a confirmation about the availability of the requested PDN modems. Presumably where the customer has previously purchased at least the number of PDN modems requested, the confirmation from multi-PDN modems 198 will indicate that the requested PDN modems are available.

A channel creation module 146 establishes a channel between cellular gateway 199 and network device 102 for each available PDN modem. Any type of communication channel supported by both network device 102 and the cellular gateway 199 may be established including, but not limited to, virtual local area network (VLAN), tunnel, or virtual interface may be established. A PDN modem to channel mapping module 148 dynamically maps each of the established channels between cellular gateway 199 and network device 102 to a respective one of the available PDN modems.

A PDN modem monitoring module 144 monitors data reception on channels 105 between each of the PDN modems and cellular gateway 199. Where data is being received via from one of the PDN modems, a traffic routing module 152 identifies the channel 103 between cellular gateway 199 and network device 102 that is designated to handle data from the particular PDN modem and transmits the received data to network device 102 via the identified channel 103. A channel monitoring module 150 monitors data reception on channels 103 between network device 102 and cellular gateway 199. Where data is being received via from one of channels 103, traffic routing module 152 identifies the PDN modem designated to handle data from the particular channel 103 and transmits the received data to the identified PDN modem via a respective channel 105.

Figure 1D:
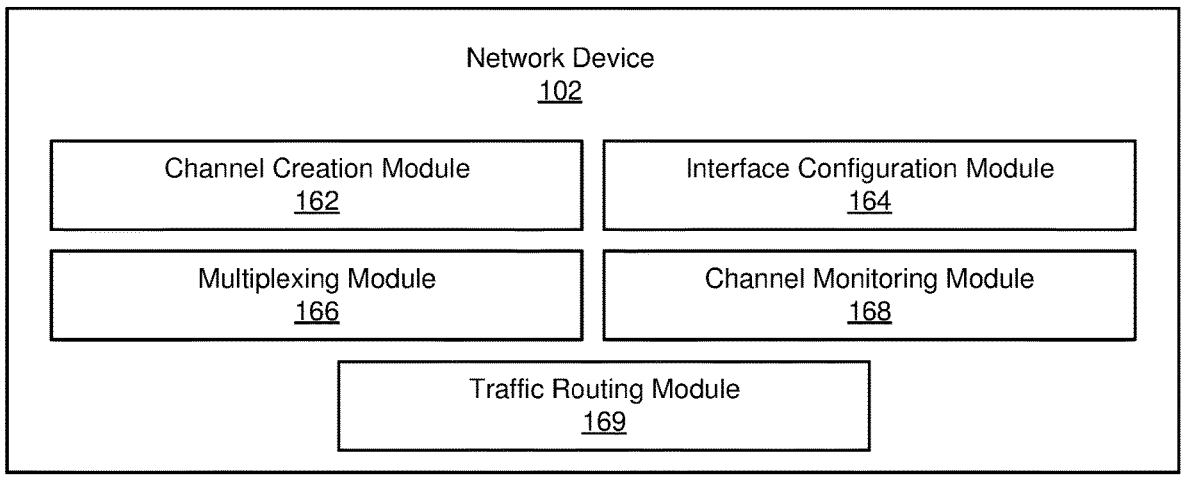
FIG. 1D is a modular diagram of a network device including functionality that may be used in relationship with various embodiments.

Turning to FIG. 1D, a modular diagram of network device 102 shows functionality that may be used in relationship with various embodiments. A channel creation module 162 is configured to create multiple channels 103 between network device 102 and cellular gateway 199. Any type of communication channel supported by both network device 102 and cellular gateway 199 may be established including, but not limited to, virtual local area network (VLAN), tunnel, or virtual interface may be established. The number of channels 103 configured depends upon the particular need of network device 102. In one embodiment, two channels 103 are created with one designated to handle type-A data traffic and the second of the channels 103 is designated to handle type-B data traffic. Based upon the disclosure provided herein, one of ordinary skill in the art will recognize different numbers of channels that may be desired and distinct purposes for each of the channels in accordance with different embodiments. The process of creating channels between network device 102 and cellular gateway 199 may be done using any approach and/or protocol known in the art for creating channels.

An interface configuration module 164 configures an interface for each of the respective channels between cellular gateway 199 and network device 102. The interface is the physical and/or virtual location on network device 102 where data to be transmitted via a particular channel is presented, and where data received on the particular channel is received. Such interface establishment may be done using any approach for provisioning and/or designating an interface that may be known in the art.

A traffic routing module 169 controls the transmission of data traffic onto difference channels 103. For example, traffic routing module 130 may direct all type-A traffic to a first of channels 103, and all of type-B traffic to a second of channels 103. Based upon the disclosure provided herein, one of ordinary skill in the art will recognize different numbers of channels that may be desired and distinct purposes for each of the channels in accordance with different embodiments, assignment of different channels to handle different types of data traffic, and direction of the different types of data traffic to the assigned channels.

A channel monitoring module 168 monitors data reception on channels 103 between network device 102 and cellular gateway 199. Where data is being received via from one of channels 103, traffic routing module 169 identifies the provides the data traffic to a multiplexing module 166. Multiplexing module 166 multiplexes data received from cellular gateway 199 via various channels 103 into a single channel distributed within the network served by network device 102 (e.g., to LAN devices 101).

Turning to FIG. 1E, an example computer system 160 in which or with which embodiments of the present invention may be utilized is shown. In some case, one or more of access node 110, endpoint device 104, endpoint management system 120, and/or central policy control 108 may be implemented to include the features of example computer system 160. As shown in FIG. 1E, computer system 160 includes an external storage device 170, a bus 172, a main memory 174, a read-only memory 176, a mass storage device 178, a communication port 180, and one or more processors 182.

Those skilled in the art will appreciate that computer system 160 may include more than one processor 182 and communication ports 180. Examples of processor 1820 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 182 may include various modules associated with embodiments of the present invention.

Communication port 180 can be any of an RS-232 port for use with a modem-based dialup connection, a 10/100 Ethernet port, a Gigabit or 10 Gigabit port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read-Only Memory 176 can be any static storage device(s) e.g., but not limited to, a Programmable Read-Only Memory (PROM) chips for storing static information e.g. start-up or BIOS instructions for processor 182.

Mass storage 178 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processor(s) 182 with the other memory, storage, and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 182 to a software system.

Optionally, operator and administrative interfaces, e.g. a display, keyboard, and a cursor control device, may also be coupled to bus 172 to support direct operator interaction with the computer system. Other operator and administrative interfaces can be provided through network connections connected through communication port 180. An external storage device 170 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned example computer system limit the scope of the present disclosure.

Figure 2:
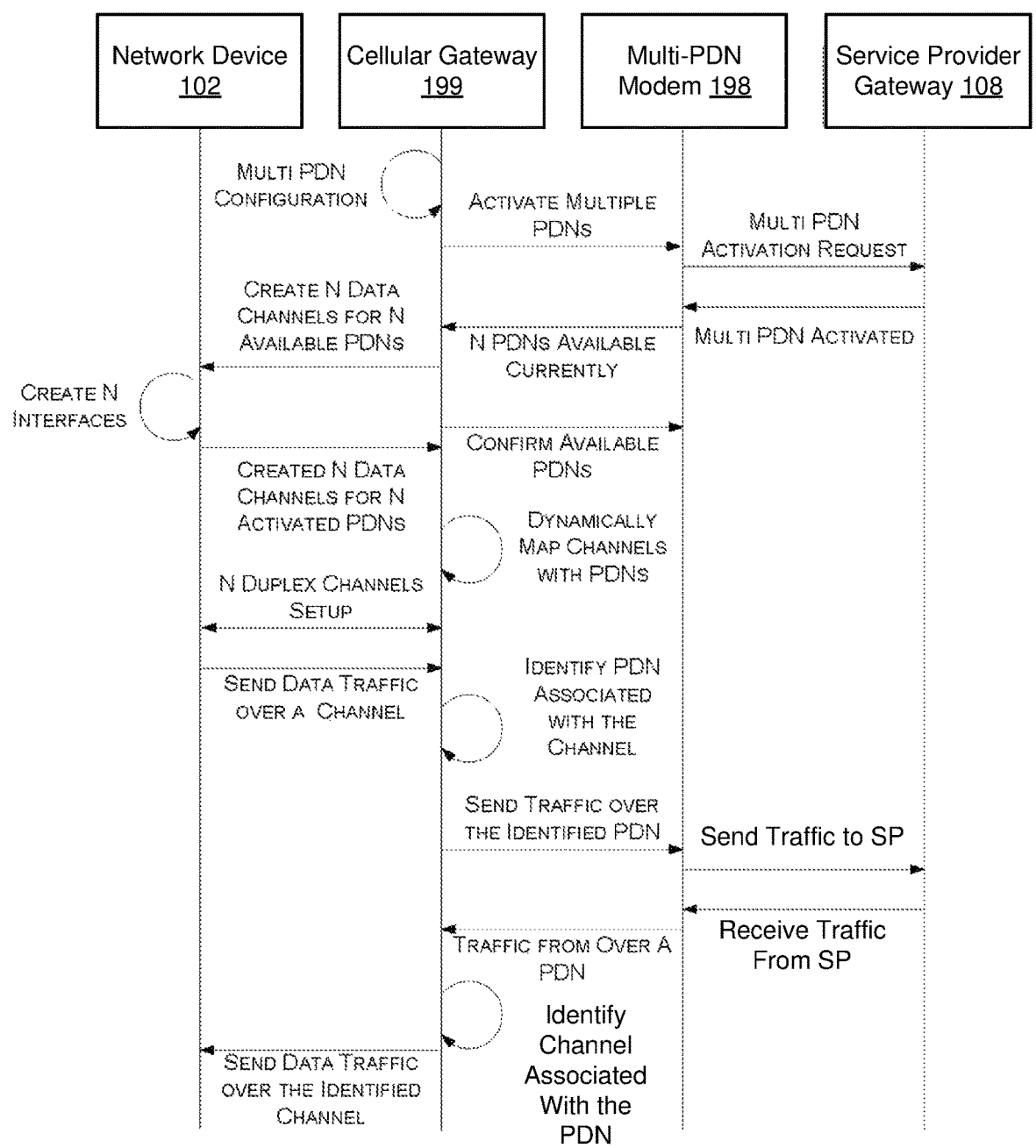
FIGS. 2-3 are message sequence diagrams showing communications between various elements of the network environment of FIG. 1A that may be applied in relation to various embodiments.

Turning to FIG. 2, a message sequence diagram 200 shows an example setup and operation protocol between various entities in the network environment of FIG. 1A. As shown in FIG. 2, the process for setting up the channels is automatic and directed by the cellular gateway. The processes discussed below in relation to FIGS. 4-7 utilize similar messaging that that shown in FIG. 2.

Figure 3:
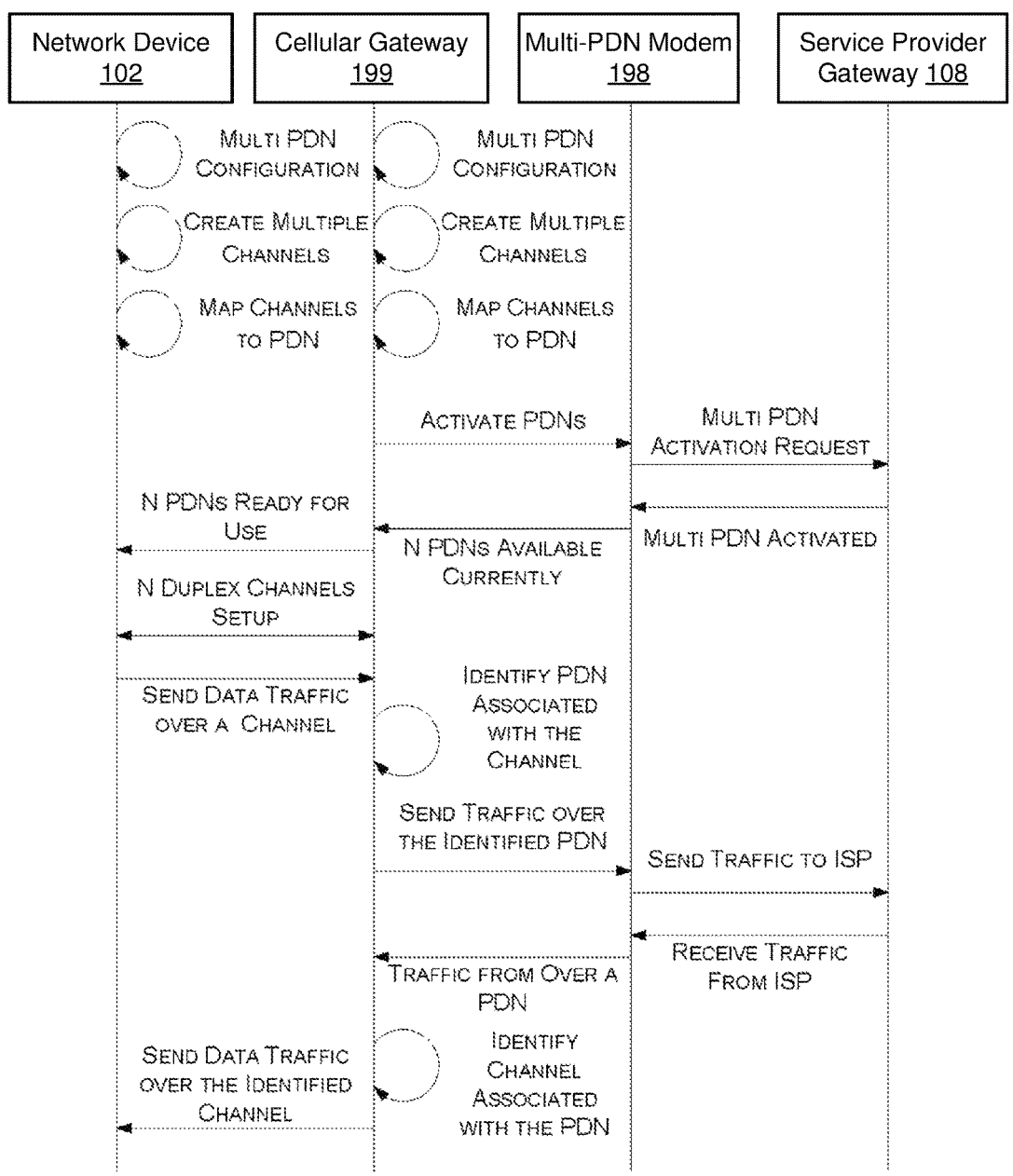

Turning to FIG. 3, a message sequence diagram 200 shows an example setup and operation protocol between various entities in the network environment of FIG. 1A. As shown in FIG. 3, the process for setting up the channels is manually controlled on each of network device 102, cellular gateway 199, and PDN modem 198. The processes discussed below in relation to FIGS. 4-7 utilize similar messaging that that shown in FIG. 2.

Figure 4:
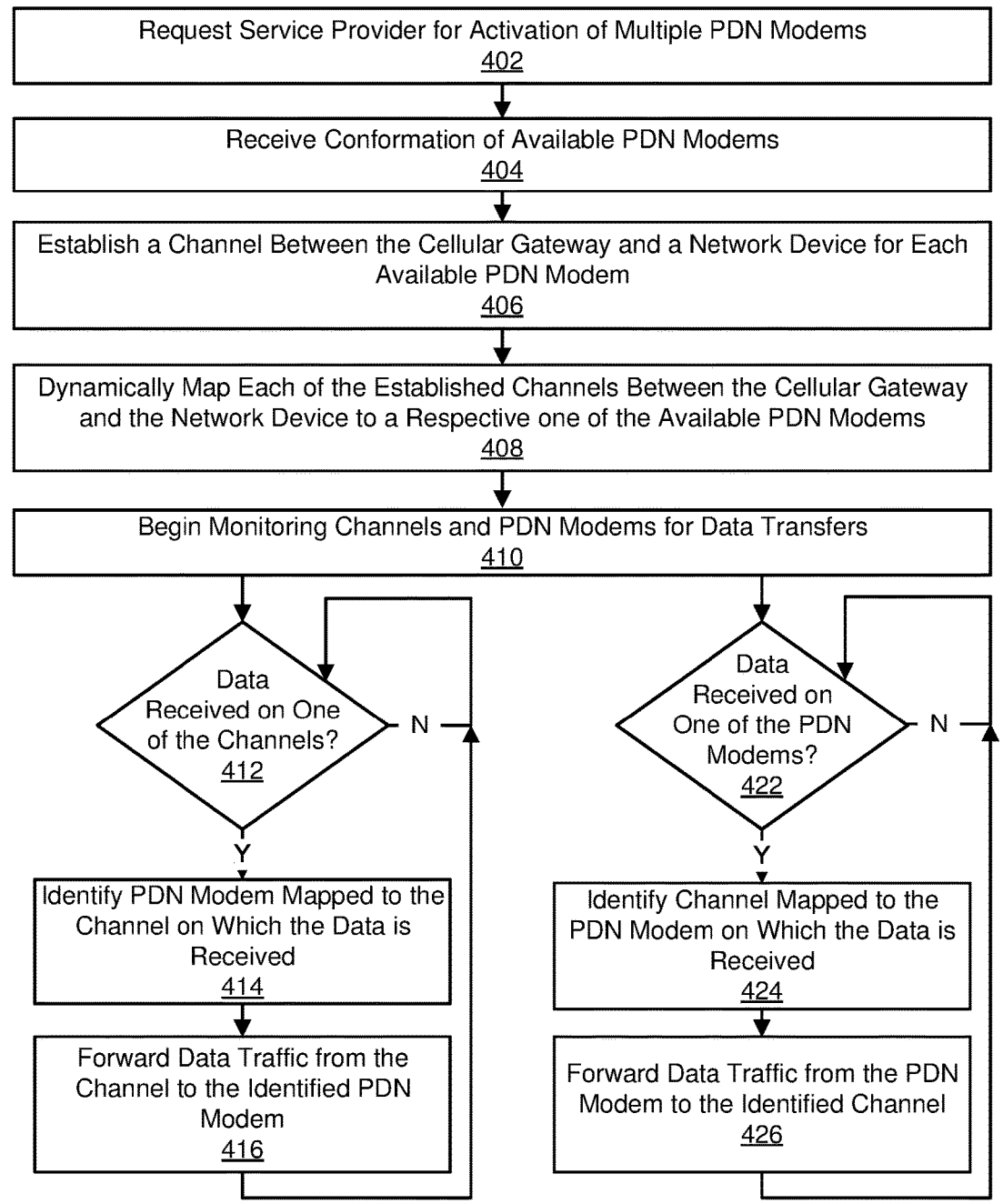
FIG. 4 is a flow diagram showing a method for operating a cellular gateway in accordance with some embodiments.

Turning to FIG. 4, a flow diagram 800 shows a method for operating a cellular gateway in accordance with some embodiments. Following flow diagram 400, the cellular gateway communicates a request to activate multiple PDN modems (block 402). In some cases, the number of PDN modems requested corresponds to a number of "lines" that have been authorized by the service provider for the cellular gateway. This authorization may be done, for example, by a user contacting the service provider to purchase support for a defined number of PDN modems. In return, the service provider provides a subscriber identity module (SIM) indicating the purchased PDN modems. This SIM is then installed in the cellular gateway.

In response to the request for the number of PDN modems, the service provider responds with a confirmation about the availability of the requested PDN modems (block 404). Presumably where the customer has previously purchased at least the number of PDN modems requested, the confirmation from the service provider will indicate that the requested PDN modems are available. For each available PDN modem the cellular gateway establishes a channel between the cellular gateway and a network device that will be the source/recipient of data on the channel (block 406). Any type of communication channel supported by both the network device and the cellular gateway may be established including, but not limited to, virtual local area network (VLAN), tunnel, or virtual interface may be established. Each of the established channels between the cellular gateway and the network device are dynamically mapped by the cellular gateway to a respective one of the available PDN modems (block 408). With the channels established and mapped to respective PDN modems, the cellular gateway begins monitoring the channels and PDN modems for data transfers (block 410).

Where it is determined that data is being received from the network device via a particular channel (block 412), the cellular gateway identifies the PDN modem that is mapped to the channel on which the data is being received (block 414), and the data received from the channel is forwarded to the identified PDN modem (block 416). Where it is determined that data is being received from the service provider via a particular PDN modem (block 422), the cellular gateway identifies the channel that is mapped to the PDN modem on which the data is being received (block 424), and the data received from the PDN modem is forwarded to the identified channel (block 426). It is noted that multiple channels and/or PDN modems may be providing data simultaneously, and in some embodiments the cellular gateway provides support to perform data forwarding for one channel in parallel to another channel.

Figure 5:
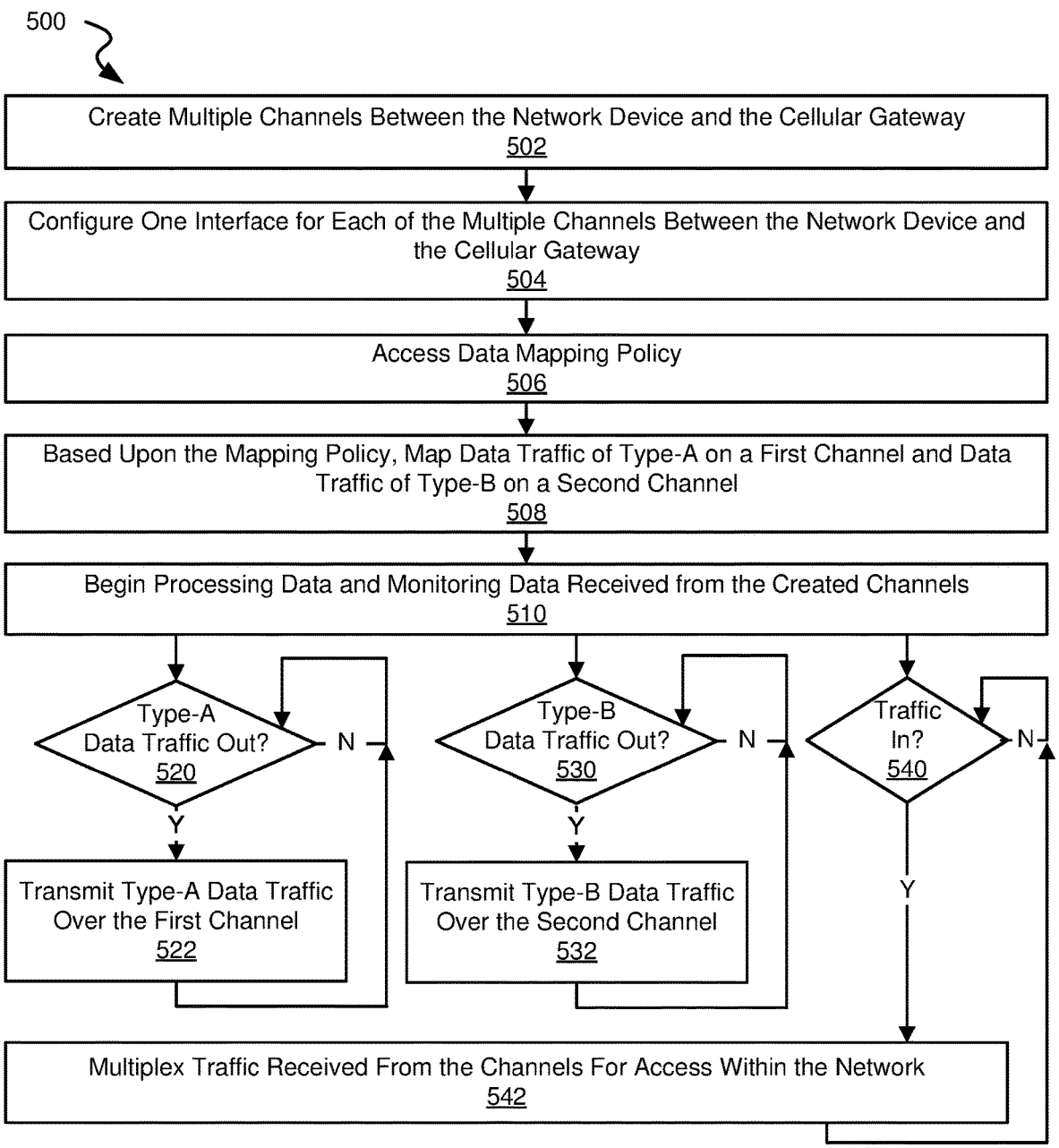
FIG. 5 is a flow diagram showing a method for operating a network device in accordance with some embodiments.

Turning to FIG. 5, a flow diagram 500 shows a method for operating a network device in accordance with some embodiments. Following flow diagram 500, the network device controls the creation of multiple channels between the network device and the cellular gateway (block 502). Any type of communication channel supported by both the network device and the cellular gateway may be established including, but not limited to, virtual local area network (VLAN), tunnel, or virtual interface may be established. The number of channels configured depends upon the particular need of the network device. In this embodiment, two channels are created with one designated to designated to handle type-A data and the second of the channels is designated to handle type-B data. Based upon the disclosure provided herein, one of ordinary skill in the art will recognize different numbers of channels that may be desired and distinct purposes for each of the channels in accordance with different embodiments. The process of creating channels between the network device and the cellular gateway may be done using any approach and/or protocol known in the art for creating channels.

An interface is established for each of the channels between the network device and the cellular gateway (block 504). The interface is the physical and/or virtual location where data to be transmitted via a particular channel is presented, and where data received on the particular channel is received. Such interface establishment may be done using any approach for provisioning and/or designating an interface that may be known in the art.

A data mapping policy is accessed (block 506). The data mapping policy may include a number of modifiable rules directing the control of various data types within the network serviced by the network device. Based upon the disclosure provided herein, one of ordinary skill in the art will recognize a variety of data types and data policies that may be governed by a data mapping policy. In this embodiment, two types of data (type-A and type-B) are addressed, but other embodiments may address other types and/or more or fewer types of data in the data mapping policy. Based upon the data mapping policy, the network device maps data traffic of type-A to the first of the two created channels, and maps data traffic of type-B to the second of the two created channels (block 508).

With the channels created and mapped, the network device begins processing data for transfer and monitoring data received via the created channels (block 510). Where it is determined that type-A data is to be transmitted (block 520), the network device transmits the type-A data over the first channel to the cellular gateway (block 522). The data may be transmitted using any protocol understandable by both the network device and the cellular gateway. In some embodiments, the protocol is the same protocol that will be used by the cellular gateway when forwarding the data onto the PDN modem. Based upon the disclosure provided herein, one of ordinary skill in the art will recognize a variety of protocols which may be used to transmit data from the network device to the cellular gateway.

Where it is determined that type-B data is to be transmitted (block 530), the network device transmits the type-B data over the second channel to the cellular gateway (block 532). Again, the data may be transmitted using any protocol understandable by both the network device and the cellular gateway. In some embodiments, the protocol is the same protocol that will be used by the cellular gateway when forwarding the data onto the PDN modem. Based upon the disclosure provided herein, one of ordinary skill in the art will recognize a variety of protocols which may be used to transmit data from the network device to the cellular gateway.

As the network device determines that data is being received from the cellular gateway via the one or more channels that were created (block 540), the received data traffic from all of the channels is multiplexed onto a common channel for transmission within the network supported by the network device (block 542).

Figure 6:
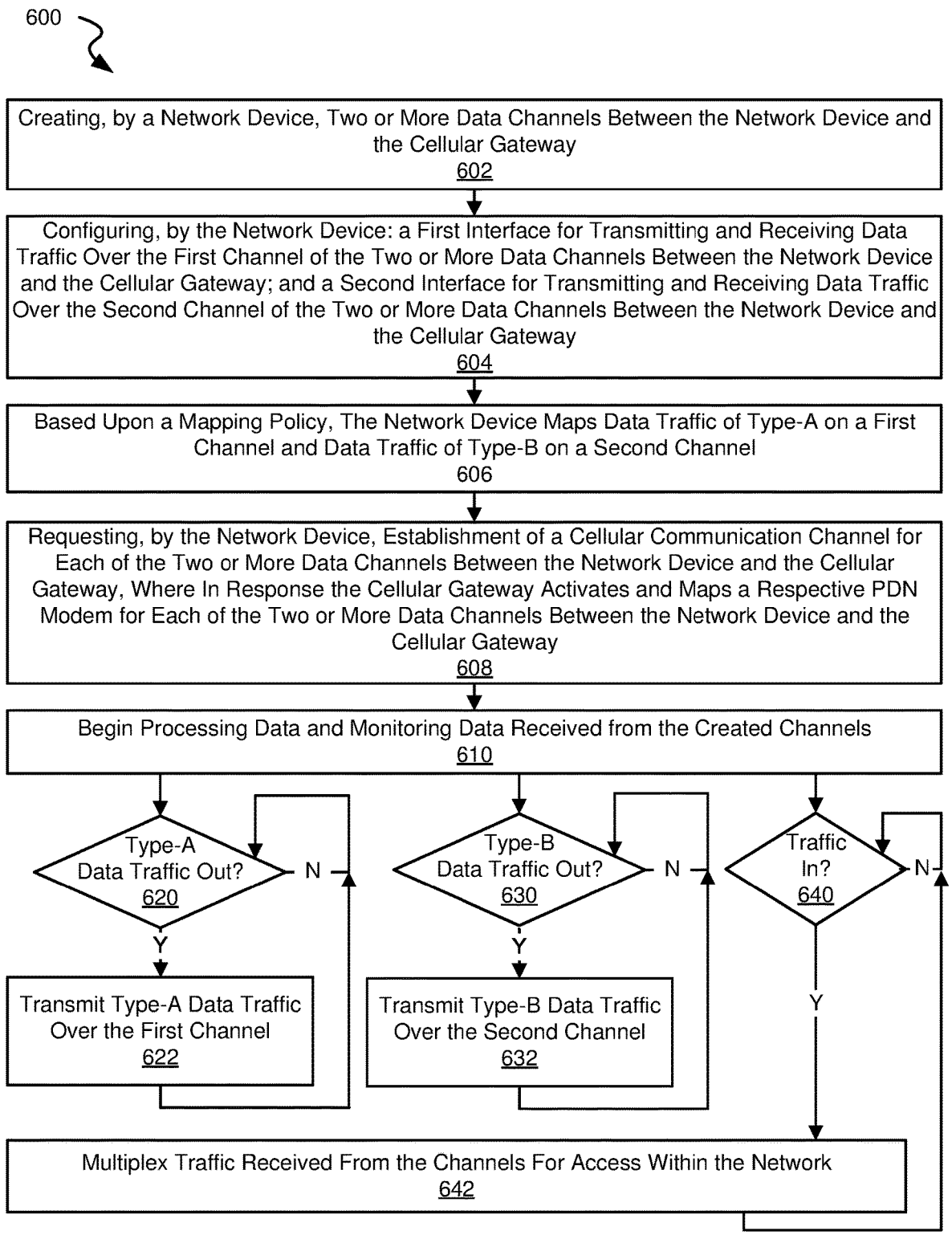
FIG. 6 is a flow diagram showing a method for extending multi-PDN support to a network device under the direction of a network device in accordance with some embodiments.

Turning to FIG. 6, a flow diagram 600 shows a method for extending multi-PDN support to a network device under direction of the network device in accordance with some embodiments. Following flow diagram 600, two or more data channels are created by a network device between the network device and a cellular gateway (block 602). Then number of data channels configured depends upon the particular need of the network device. In this embodiment, two data channels are created with one designated to handle type-A data and the second of the data channels is designated to handle type-B data. Based upon the disclosure provided herein, one of ordinary skill in the art will recognize different numbers of channels that may be desired and distinct purposes for each of the channels in accordance with different embodiments. The process of creating channels between the network device and the cellular gateway may be done using any approach and/or protocol known in the art for creating channels.

An interface is established for each of the data channels between the network device and the cellular gateway (block 604). In this embodiment, a first interface is established for a first channel of the two or more data channels between the network device and the cellular gateway, and a second interface is established for a second channel of the two or more data channels between the network device and the cellular gateway. Each of the interfaces is a physical and/or virtual location where data to be transmitted via a particular data channel is presented, and where data received on the particular data channel is received. Such interface establishment may be done using any approach for provisioning and/or designating an interface that may be known in the art.

Based upon the data mapping policy, the network device maps data traffic of type-A to the first of the two created channels, and maps data traffic of type-B to the second of the two created channels (block 606). The data mapping policy may include a number of modifiable rules directing the control of various data types within the network serviced by the network device. Based upon the disclosure provided herein, one of ordinary skill in the art will recognize a variety of data types and data policies that may be governed by a data mapping policy. In this embodiment, two types of data (type-A and type-B) are addressed, but other embodiments may address other types and/or more or fewer types of data in the data mapping policy.

The network device requests establishment of a cellular communication channel for each of the two or more channels created between the network device and the cellular gateway (block 608). Such a request is made to the cellular gateway and requests establishment of cellular communication channels between the cellular gateway and a service provider via respective PDN modems. In response to the request, the cellular gateway creates the requested cellular communication channels. While this embodiment is discussed as the cellular gateway creating the cellular communication channels upon request from the network device, in other embodiments, the cellular gateway automatically establishes as many cellular communication channels as it is allowed at start-up. The number of allowed cellular communication channels may be based upon a number of "lines" purchased by a user of the cellular gateway, and for each of the number of lines the service provider provides a SIM that is installed in the cellular gateway.

Creating the cellular communication channels, by the cellular gateway, may include requesting activation of multiple PDN modems; receiving a confirmation of that the requested number of PDN modems are available; and for each data channel between the network device and the cellular gateway, the cellular gateway maps the data channel to a respective one of the PDN modems.

With the data channels between the network device and the cellular gateway created and mapped to respective PDN modems that support respective cellular communication channels between the cellular gateway and the service provider, the network device begins processing data for transfer and monitoring data received via the created data channels (block 610). Where it is determined that type-A data is to be transmitted (block 620), the network device transmits the type-A data over the first channel to the cellular gateway (block 622). The data may be transmitted using any protocol understandable by both the network device and the cellular gateway. In some embodiments, the protocol is the same protocol that will be used by the cellular gateway when forwarding the data onto the PDN modem. Based upon the disclosure provided herein, one of ordinary skill in the art will recognize a variety of protocols which may be used to transmit data from the network device to the cellular gateway.

Where it is determined that type-B data is to be transmitted (block 630), the network device transmits the type-B data over the second channel to the cellular gateway (block 632). Again, the data may be transmitted using any protocol understandable by both the network device and the cellular gateway. In some embodiments, the protocol is the same protocol that will be used by the cellular gateway when forwarding the data onto the PDN modem. Based upon the disclosure provided herein, one of ordinary skill in the art will recognize a variety of protocols which may be used to transmit data from the network device to the cellular gateway.

As the network device determines that data is being received from the cellular gateway via the one or more channels that were created (block 640), the received data traffic from all of the channels is multiplexed onto a common channel for transmission within the network supported by the network device (block 642).

Figure 7:
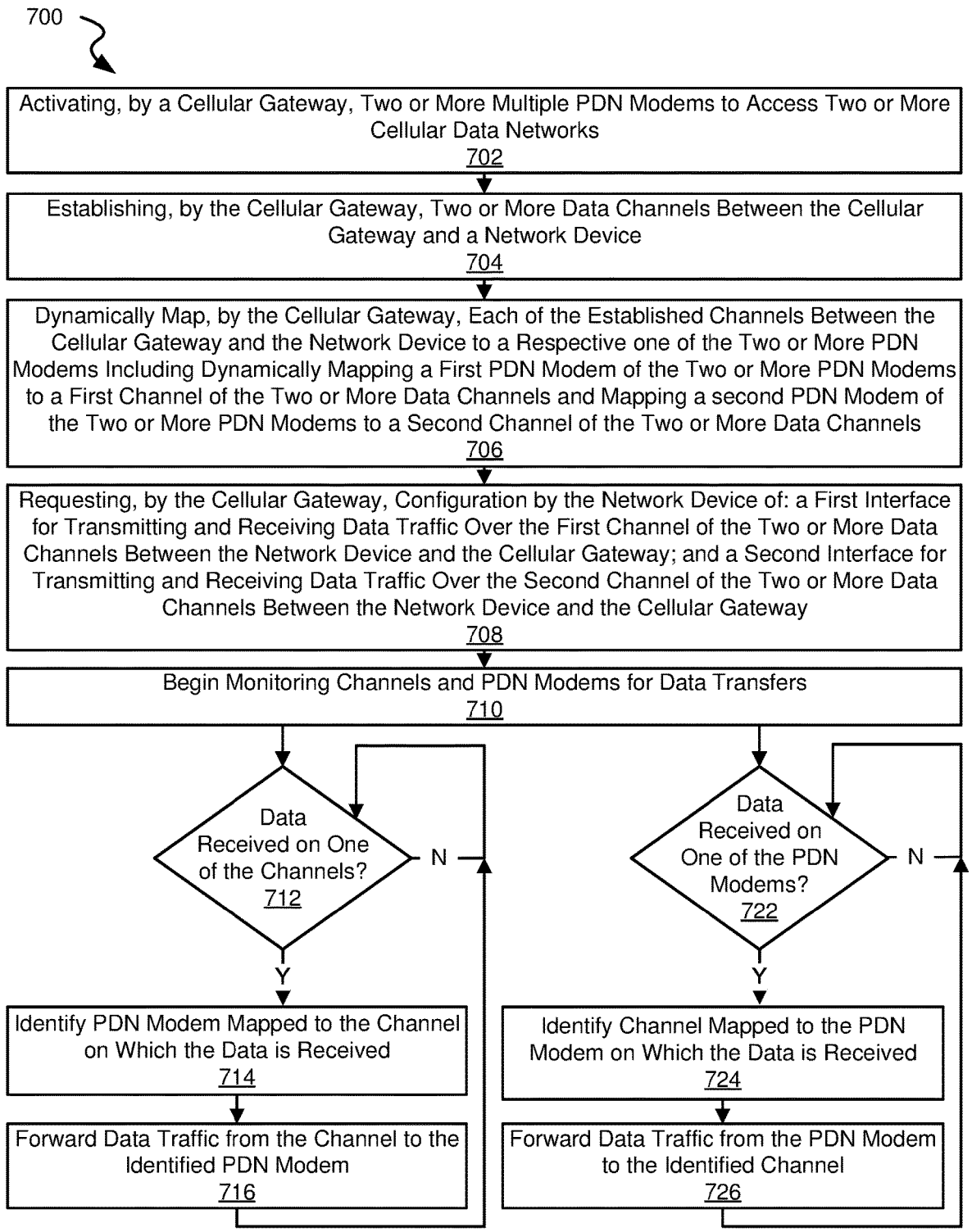
FIG. 7 is a flow diagram showing another method for extending multi-PDN support to a network device under direction of a cellular gateway in accordance with various embodiments.

FIG. 7 is a flow diagram showing another method for extending multi-PDN support to a network device under direction of a cellular gateway in accordance with various embodiments. Following flow diagram 700, the cellular gateway communicates a request to activate multiple PDN modems (block 702). The cellular gateway additionally two or more data channels between the cellular gateway and a network device that will be the source/recipient of data on the channel (block 704). Any type of communication channel supported by both the network device and the cellular gateway may be established including, but not limited to, virtual local area network (VLAN), tunnel, or virtual interface may be established. For each of the channels established between the cellular gateway and the network device, the cellular gateway dynamically maps a respective one of the two or more PDN modems to the particular channel (block 606). This includes mapping a first of the two or more data channels to a first of the two or more PDN modems, and mapping a second of the two or more data channels to a second of the two or more PDN modems.

The cellular gateway requests that the network device configure a first interface for transmitting and receiving data traffic over the first channel of the two or more data channels between the network device and the cellular gateway; and a second interface for transmitting and receiving data traffic over the second channel of the two or more data channels between the network device and the cellular gateway (block 708). Each of the interfaces is a physical and/or virtual location at the network device where data to be transmitted via a particular data channel is presented, and where data received on the particular data channel is received. Such interface establishment may be done using any approach for provisioning and/or designating an interface that may be known in the art. As part of configuring the interfaces, the network device maps data traffic of type-A to the first of the two created channels, and maps data traffic of type-B to the second of the two created channels in accordance with a data mapping policy. The data mapping policy may include a number of modifiable rules directing the control of various data types within the network serviced by the network device. Based upon the disclosure provided herein, one of ordinary skill in the art will recognize a variety of data types and data policies that may be governed by a data mapping policy. In this embodiment, two types of data (type-A and type-B) are addressed, but other embodiments may address other types and/or more or fewer types of data in the data mapping policy.

With the channels established and mapped to respective PDN modems, the cellular gateway begins monitoring the channels and PDN modems for data transfers (block 710). Where it is determined that data is being received from the network device via a particular channel (block 712), the cellular gateway identifies the PDN modem that is mapped to the channel on which the data is being received (block 714), and the data received from the channel is forwarded to the identified PDN modem (block 716). Where it is determined that data is being received from the service provider via a particular PDN modem (block 722), the cellular gateway identifies the channel that is mapped to the PDN modem on which the data is being received (block 724), and the data received from the PDN modem is forwarded to the identified channel (block 726). It is noted that multiple channels and/or PDN modems may be providing data simultaneously, and in some embodiments the cellular gateway provides support to perform data forwarding for one channel in parallel to another channel.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method, the method comprising:
    creating, by a network device, at least a first data channel between the network device and a cellular gateway device, and a second data channel between the network device and the cellular gateway device;
    configuring, by the network device, a first interface for transferring data over the first data channel and a second interface for transferring data over the second data channel;
    mapping, by the network device, a first type of data to the first interface and a second type of data to the second interface;
    requesting, by the network device, establishment of a first cellular communication channel for the first data channel, and a second cellular communication channel for the second data channel;
    identifying, by the network device, a first data set as including the first type of data, and transferring, by the network device, the first data set to the first cellular communication channel via the first interface, the first data channel, and the cellular gateway device;
    identifying, but the network device, a second data set as including the second type of data, and transferring, by the network device, the second data set to the second cellular communication channel via the second interface, the second data channel, and the cellular gateway device; and
    multiplexing, by the network device, a third data set received from the cellular network via the cellular gateway device, the first data channel, and the first interface and a fourth data set received from the cellular network via the cellular gateway device, the second data channel, and the second interface into a common transmission data set for distribution with a network serviced by the network device.

2. The method of claim 1, wherein the network device is a network access device.

3. The method of claim 2, wherein the network access device is a network firewall.

4. The method of claim 1, wherein the first type of data is streaming data, and wherein the second type of data is non-streaming data.

5. A network firewall device, the network firewall device comprising:
    a processing device;
    a non-transitory computer readable medium including instructions which when executed by the processing device cause the processing device to:
        create at least a first data channel between the network firewall device and a cellular gateway device, and a second data channel between the network device and a the cellular gateway device, wherein the cellular gateway device is a multi-modem cellular gateway including a gateway device, a first modem having a first subscriber identity module corresponding to a first communication channel to a cellular network, and a second modem having a second subscriber identity module corresponding to a second communication channel to the cellular network;
        configure a first interface for transferring data over the first data channel and a second interface for transferring data over the second data channel;
        map a first type of data to the first interface and a second type of data to the second interface;
        request establishment of a first cellular communication channel for the first data channel, and a second cellular communication channel for the second data channel;
        identify a first data set as including the first type of data, and transferring, by the network firewall device, the first data set to the first cellular communication channel via the first interface, the first data channel, and the cellular gateway device; and
        identify a second data set as including the second type of data, and transferring, by the network firewall device, the second data set to the second cellular communication channel via the second interface, the second data channel, and the cellular gateway device.

6. The network firewall device of claim 5, wherein the first type of data is streaming data, and wherein the second type of data is non-streaming data.

7. The network firewall device of claim 5, wherein the non-transitory computer readable medium further includes instructions which when executed by the processing device cause the processing device to multiplex a third data set received from a the cellular network via the cellular gateway device, the first data channel, and the first interface and a fourth data set received from the cellular network via the cellular gateway device, the second data channel, and the second interface into a common transmission data set for distribution with a network serviced by the network device.

8. A non-transient computer readable medium, wherein the non-transient computer readable medium includes instructions executable by a processing resource to:
- create at least a first data channel between a network device and a cellular gateway device, and a second data channel between the network device and the cellular gateway device;
- configure a first interface for transferring data over the first data channel and a second interface for transferring data over the second data channel;
- map a first type of data to the first interface and a second type of data to the second interface;
- request establishment of a first cellular communication channel for the first data channel, and a second cellular communication channel for the second data channel;
- identify a first data set as including the first type of data, and transferring, by the network device, the first data set to the first cellular communication channel via the first interface, the first data channel, and the cellular gateway device;
- identify a second data set as including the second type of data, and transferring, by the network device, the second data set to the second cellular communication channel via the second interface, the second data channel, and the cellular gateway device; and
- multiplex a third data set received from the cellular network via a cellular gateway, the first data channel, and the first interface and a fourth data set received from the cellular network via the cellular gateway, the second data channel, and the second interface into a common transmission data set for distribution with a network serviced by the network device.

9. The non-transient computer readable medium of claim 8, wherein the network device is a network access device.

10. The non-transient computer readable medium of claim 8, wherein the network access device is a network firewall.

11. The non-transient computer readable medium of claim 8, wherein the cellular gateway is a multi-modem cellular gateway including a gateway device, a first modem having a first subscriber identity module corresponding to a first communication channel to the cellular network, and a second modem having a second subscriber identity module corresponding to a second communication channel to the cellular network.

12. The non-transient computer readable medium of claim 8, wherein the first type of data is streaming data, and wherein the second type of data is non-streaming data.

13. A method for governing cellular communications using a network device, the method comprising:
- creating, by the network device, a first data channel between the network device and a cellular gateway device, wherein a first interface is configured to transfer data over the first data channel, wherein the cellular gateway device is a multi-modem cellular gateway including a gateway device, a first modem having a first subscriber identity module corresponding to a first communication channel to a cellular network, and a second modem having a second subscriber identity module corresponding to a second communication channel to the cellular network;
- creating, by the network device, a second data channel between the network device and the cellular gateway device, wherein a second interface is configured to transfer data over the second data channel;
- mapping, by the network device, a first type of data to the first interface and a second type of data to the second interface;
- requesting, by the network device, establishment of a first cellular communication channel for the first data channel, and a second cellular communication channel for the second data channel;
- identifying, by the network device, a first data set as including the first type of data, and transferring, by the network device, the first data set to the first cellular communication channel via the first interface, the first data channel, and the cellular gateway device; and
- identifying, but the network device, a second data set as including the second type of data, and transferring, by the network device, the second data set to the second cellular communication channel via the second interface, the second data channel, and the cellular gateway device.

14. The method of claim 13, the method further comprising:
- multiplexing, by the network device, a third data set received from the cellular network via the cellular gateway device, the first data channel, and the first interface and a fourth data set received from the cellular network via the cellular gateway device, the second data channel, and the second interface into a common transmission data set for distribution with a network serviced by the network device.

15. The method of claim 13, wherein the network device is a network access device.

16. The method of claim 15, wherein the network access device is a network firewall.

17. A method, the method comprising:
- creating, by a network device, at least a first data channel between the network device and a cellular gateway device, and a second data channel between the network device and the cellular gateway device, wherein the cellular gateway device is a multi-modem cellular gateway including a gateway device, a first modem having a first subscriber identity module corresponding to a first communication channel to a the cellular network, and a second modem having a second subscriber identity module corresponding to a second communication channel to the cellular network;
- configuring, by the network device, a first interface for transferring data over the first data channel and a second interface for transferring data over the second data channel;
- mapping, by the network device, a first type of data to the first interface and a second type of data to the second interface;
- requesting, by the network device, establishment of a first cellular communication channel for the first data channel, and a second cellular communication channel for the second data channel;
- identifying, by the network device, a first data set as including the first type of data, and transferring, by the network device, the first data set to the first cellular communication channel via the first interface, the first data channel, and the cellular gateway device; and
- identifying, but the network device, a second data set as including the second type of data, and transferring, by the network device, the second data set to the second cellular communication channel via the second interface, the second data channel, and the cellular gateway device.

18. The method of claim 17, wherein the network device is a network access device.

19. The method of claim 17, wherein the network access device is a network firewall.

20. The method of claim 17, wherein the first type of data is streaming data, and wherein the second type of data is non-streaming data.

\* \* \* \* \*